Aug. 13, 1957
W. G. HESS
2,802,931
OVERLAPPED JOINT WELDING DEVICE
Filed Jan. 8, 1951
5 Sheets-Sheet 1
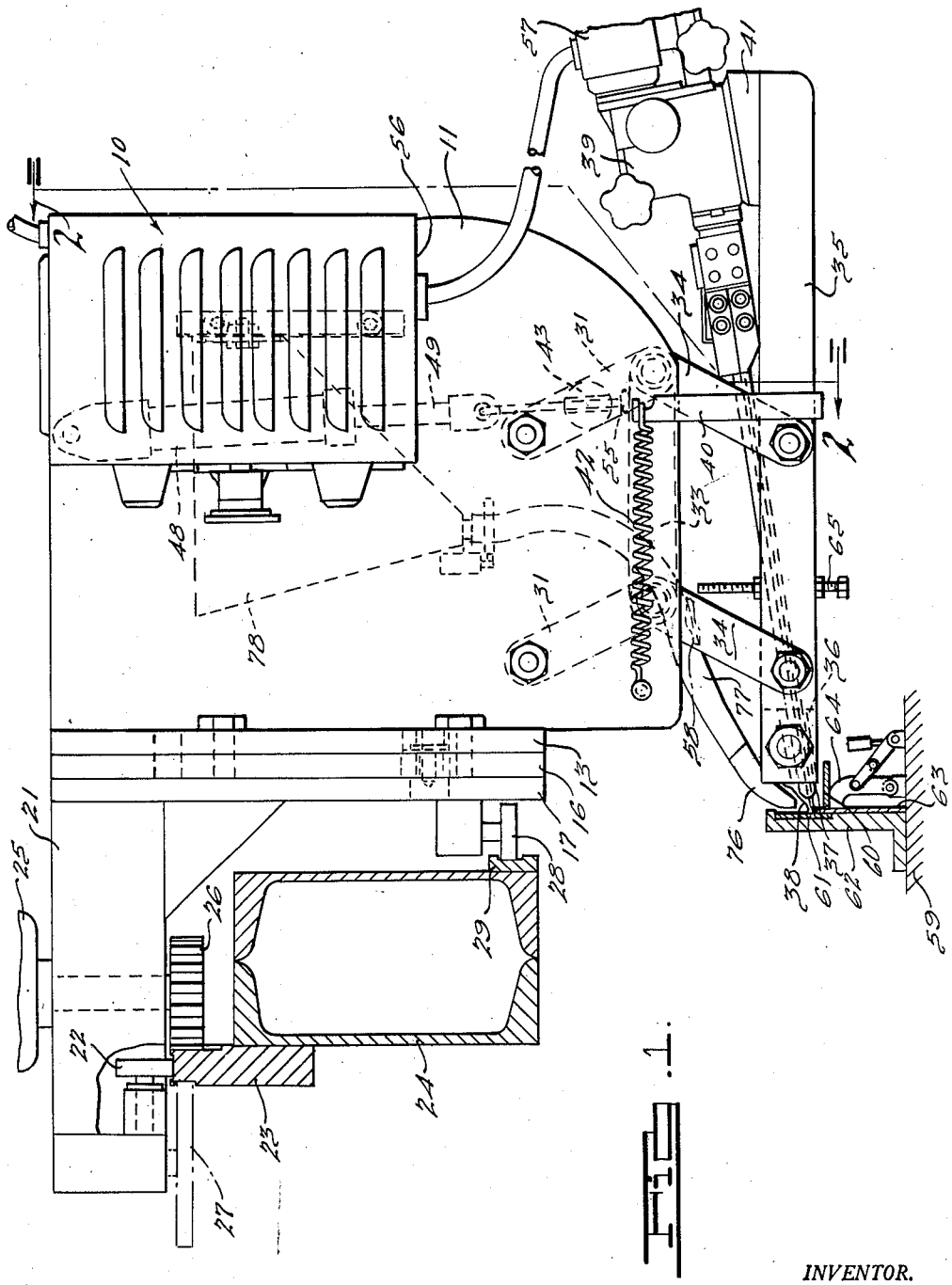
INVENTOR.
Werner G. Hess.
BY
Harness, Dickey & Pierce.
ATTORNEYS.

Aug. 13, 1957 W. G. HESS 2,802,931
OVERLAPPED JOINT WELDING DEVICE
Filed Jan. 8, 1951 5 Sheets-Sheet 2
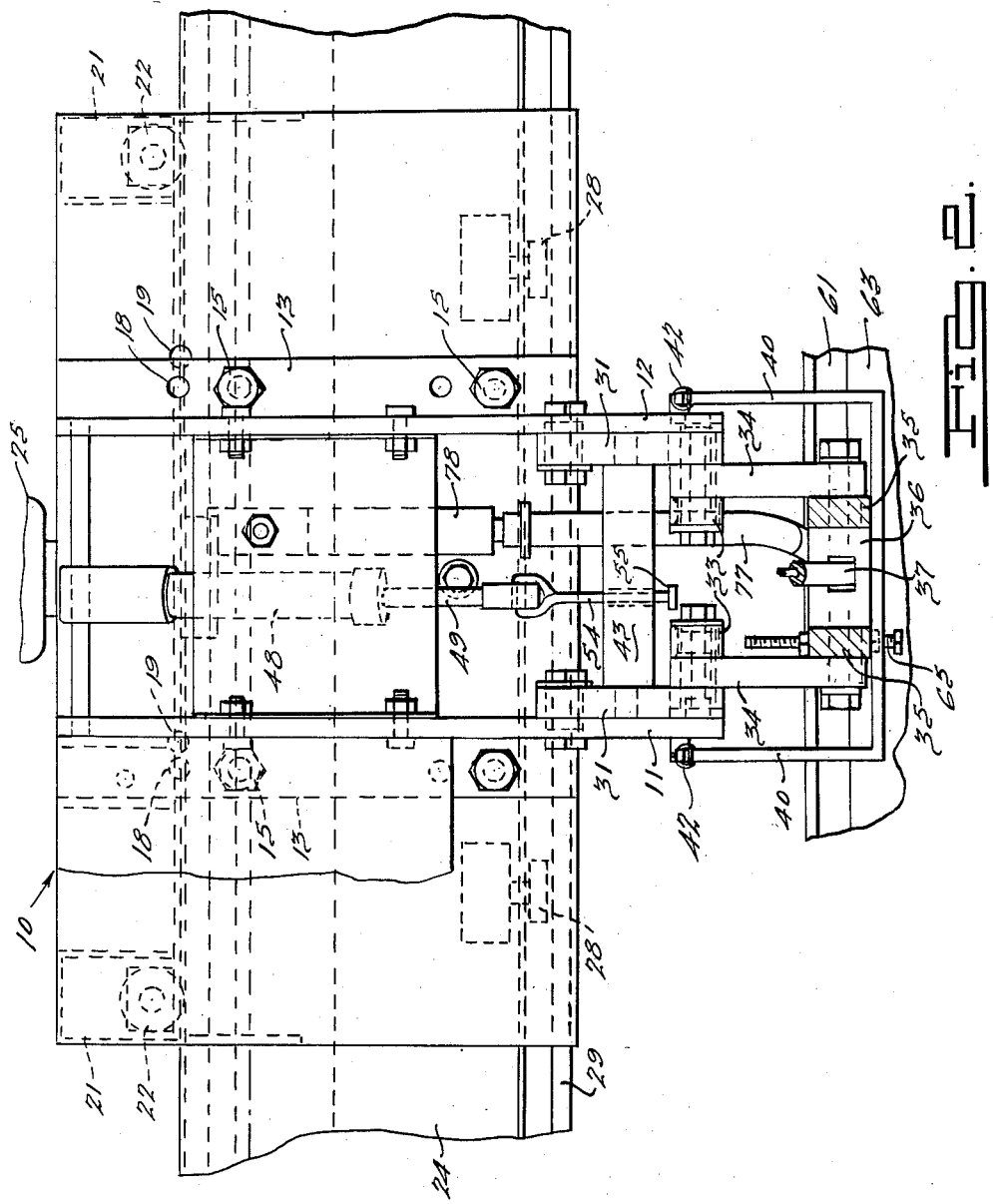
INVENTOR.
Werner G. Hess.
BY
Harness, Dickey & Pierce
ATTORNEYS.

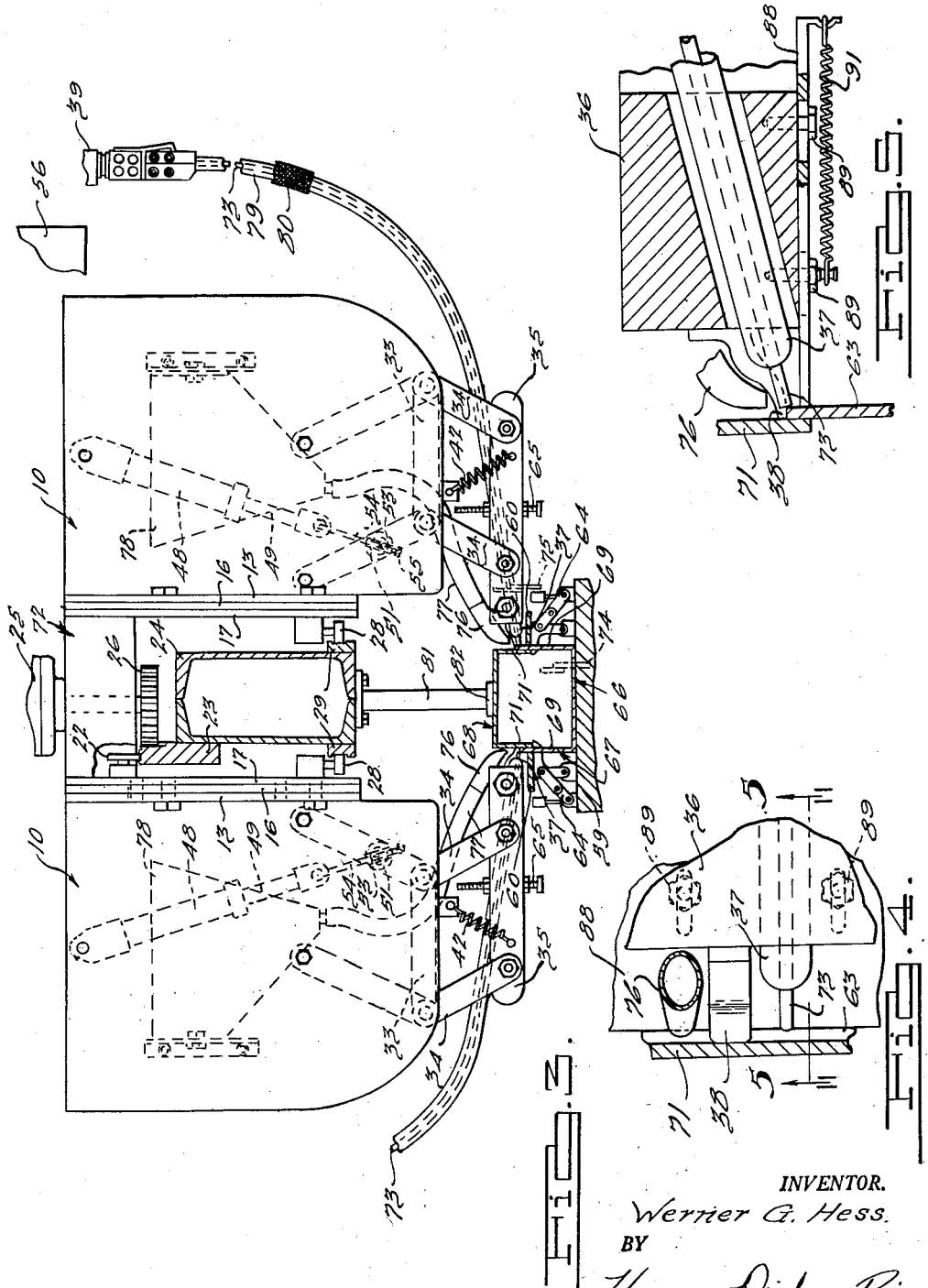

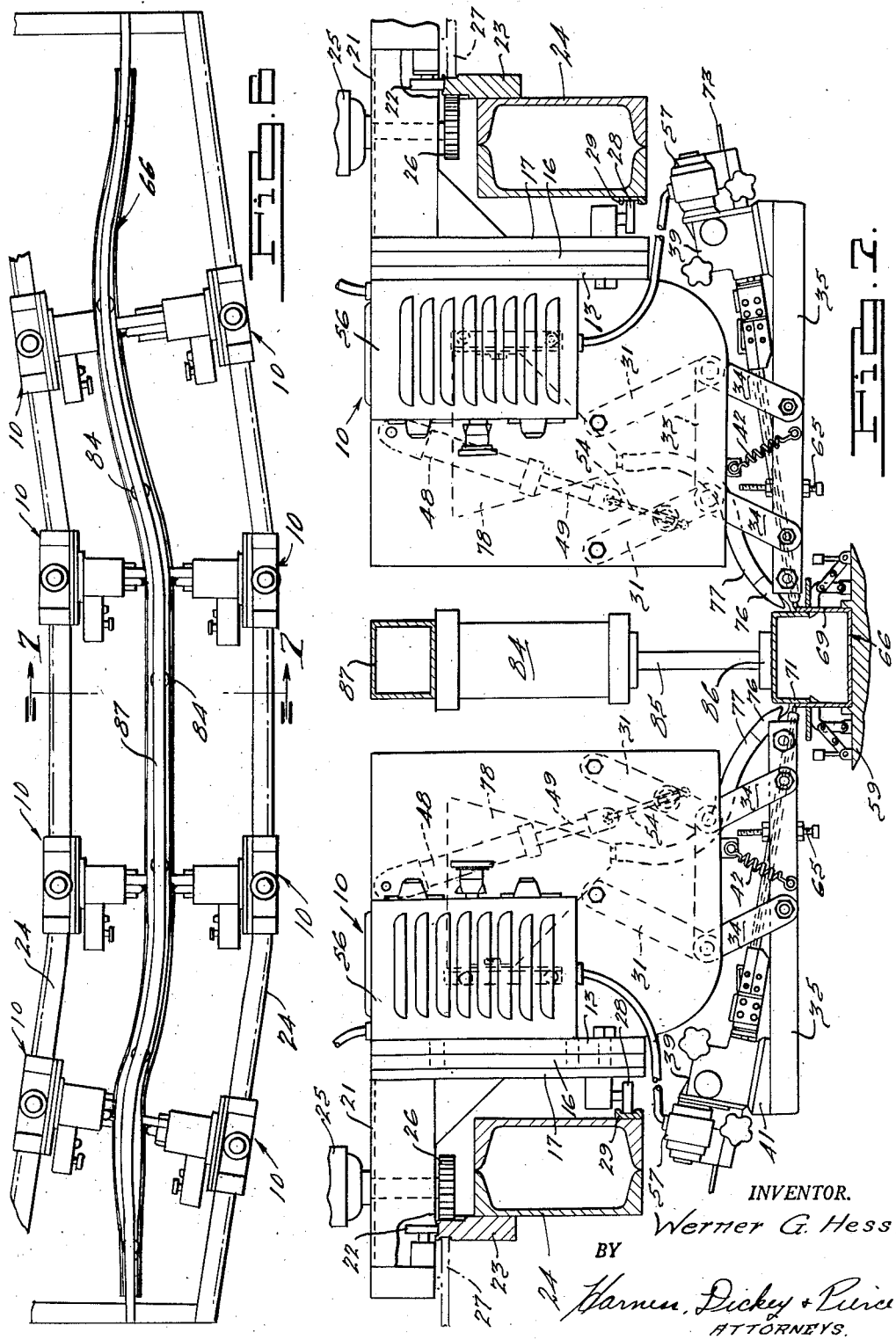

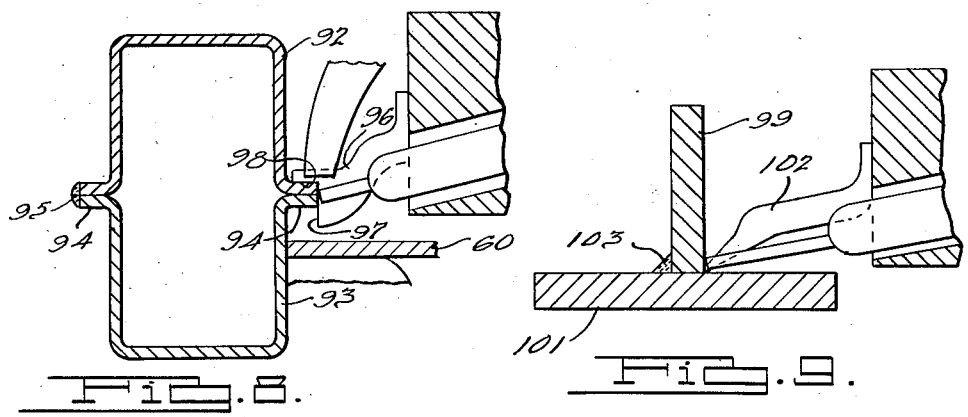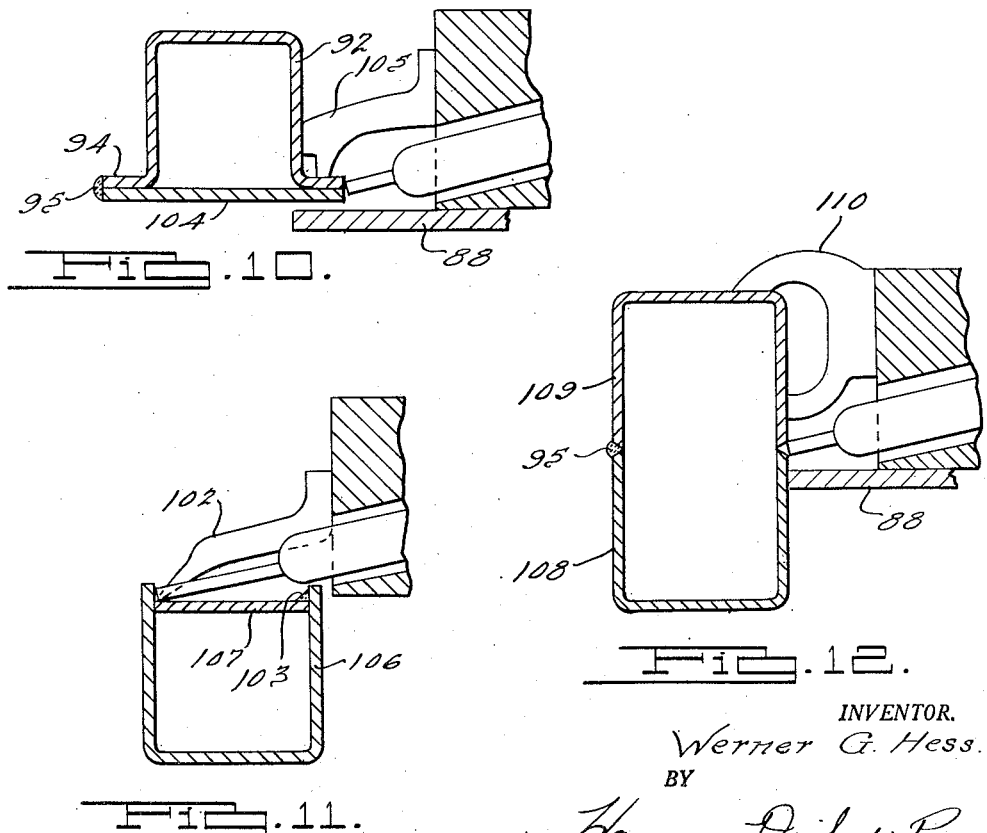

United States Patent Office 2,802,931
Patented Aug. 13, 1957

2,802,931

OVERLAPPED JOINT WELDING DEVICE

Werner G. Hess, Dearborn, Mich., assignor, by mesne assignments, to Dana Corporation, Toledo, Ohio, a corporation of Virginia Application January 8, 1951, Serial No. 204,864

13 Claims. (Cl. 219—73)

This invention relates to welding apparatus, and particularly to an automatic welding device for undulated joints along which the welding electrode may be accurately guided.

Difficulty has been experienced in the past when automatically welding undulated joints when guiding the welding rod along the joints by the use of cams or master cam surfaces and the like which lack accuracy in guiding the welding rod along the joint.

The present invention contemplates the use of a double parallelogram support for a welding rod and guiding finger which are disposed in juxtaposition so as to have the rod accurately follow the joint and guide the welding rod therealong. The double parallelogram support causes the finger to first engage the surface above the joint and thereafter move downwardly to engage and follow the joint irrespective of whether the joint changes its position to the right or left or up or down from the point at which welding begins. After a joint has been welded, the double parallelogram support is collapsed to withdraw the finger and the welding rod away from the welded joint so that the welding device may be returned to its starting position along a supporting track on which it is advanced. The device may carry the control mechanism for feeding the rod along with the flux hopper and delivery nozzle. The mechanism may be supported remote from the device and is of a standard type procurable in the trade. Machines may be constructed which employ a single device, or a pair of devices may be utilized to operate on opposite sides of channel or like workpieces, or a plurality of heads may be supported on the same or individual trackways when the workpiece is of substantial length to operate simultaneously thereon to reduce the time required to weld a single unit in the machine.

Accordingly, the main objects of the invention are: to provide a welding device in which the welding rod is guided directly by the joint which is to be welded; to provide a welding device having a double parallelogram support for the welding rod and a finger which remains at all times in contact with the joint so that the welding rod is accurately guided therealong; to construct a machine with a plurality of welding devices, each having a double parallelogram support for a guide and welding rod and having thereon a support for the welding rod and for flux to be used in the welding operation; to provide a machine for welding overlapped elements together at the joint thereof by supporting welding devices following the longitudinal contour of the joint, with the welding rod accurately guided by a finger supported on a double parallelogram support which remains in engagement at all times with the top edge of the outer element of the joint; to provide a welding machine with tracks following the longitudinal contour of the work to be welded at an undulated joint formed therealong, with a plurality of welding devices spaced substantially the same distance apart so as to reduce the time required to weld the entire length of the joint when operated simultaneously; and, in general, to provide a welding device for an undulated joint which is simple in construction, positive in operation and economical of manufacture.

Other objects and features of novelty of the invention will be specifically pointed out or will become apparent when referring, for a better understanding of the invention, to the following description taken in conjunction with the accompanying drawings, wherein:

Figure 1 is a view in elevation of a welding device embodying features of the present invention;

Fig. 2 is a broken end view of the structure illustrated in Fig. 1;

Fig. 3 is a view of structure, similar to that illustrated in Fig. 1, showing a further form which the invention may assume;

Fig. 4 is an enlarged broken view of the structure illustrated in Fig. 3, showing a flux platform carried by the device;

Fig. 5 is a sectional view of the structure illustrated in Fig. 4, taken on the line 5—5 thereof;

Fig. 6 is a plan view of the machine, similar to that illustrated in Fig. 3, showing a further form which it may assume;

Fig. 7 is an enlarged sectional view of the structure illustrated in Fig. 6, taken on the line 7—7 thereof, and Figs. 8—12 illustrate different types of joints which may be welded by the device of the present invention.

Referring more specifically to Figs. 1 and 2, a welding device 10 is illustrated comprising a pair of side plates 11 and 12 extending from a back plate 13 which is secured by a central bolt 14 and four additional bolts 15 to a plate 16 mounted on a plate 17. Additional apertures 18 are provided in the plate 13 and threaded apertures 19 are provided in the plate 16. The apertures 18 and 19 permit the angular adjustment of the plate 13 on the plate 17 to a degree depending on the contour of the joint of the workpiece. The plate 17 is suspended from a pair of cross members 21 each of which supports a roller 22 which rides upon a rail 23 on a track 24. A motor 25 is supported between the rail members 21 and is employed for driving a serrated wheel or spur gear 26 which is in engagement with the inner face of the rail 23 or with teeth provided thereon. The cross members 21 carry a wheel 22 opposite to the serrated wheel or gear 26 for retaining the latter in engagement with the rail. The forward lower edge of the plate 17 supports a pair of rollers 28 which engage a recessed track in a rail member 29 at the bottom of the track 24. In this manner, the plate 17 may be carried along the track 24 while supporting the welding device 10.

Between the plates 11 and 12 two pairs of links 31 are pivoted on studs 32. The lower ends of the links are interconnected by a cross bar 33 and support two pairs of links 34 which are pivoted thereon. The two pairs of links 34 support the cross bars 35 which are joined at their front end by a filler block 36 having an aperture through which the welding rod guiding tip 37 extends. The forward end of the filler block has a guiding finger 38 projecting forwardly therefrom for a purpose which will be described hereinafter. It is to be understood that the pairs of links 31 nad 34 are freely swingable and that roller, needle or like bearings (not illustrated) may be employed at the points of connection and support.

A feeding mechanism for the welding rod is illustrated at 39, being carried by a transverse cross member 41 at the rear end of the cross bars 35. A spring 42 at each side of the device applies a forward pull on an arm 40 on the cross bar 35 and tends to urge the cross bar 35 toward the work independent of the links 31. A cylinder 48 is carried between the plates 11 nad 12, having a fluid-actuated piston rod 49 which is extendable and retractable relative to the cylinder. The right-hand pair of links 31 is interconnected by a bar 51 having an aperture 53 therethrough through which a rod or cable 54 extends, having a cross bar 55 on the lower end so that when the piston rod 49 is extended the links 31 are free to pivot forwardly without interference by the cross bar 55.

The plate 11 carries a control box 56 for operating the motor 57 on the feeding mechanism 39 for controlling the feeding of the rod during the operation. This mechanism, as pointed out above, is old and well known in the art and procurable in the trade as a complete feed unit for a welding rod. After a welding operation, the piston rod 49 is retracted, thereby swinging the arms 31 counterclockwise, withdrawing the guide finger 38 from engagement with the work and permitting the springs 42 to draw the cross members 35 upwardly against the cross members 33. This retracts the welding rod to the point 58 and the work which was welded may thereafter be removed and additional elements to be welded may then be inserted in position on a table 59, as illustrated in the figure. The welding device may then be returned to its initial position, or if the workpiece is moved while the welding device is stationary, the table carrying the workpiece is returned to its initial position.

A plate 61 is shown as being supported in a fixture 62, with a plate 63 to be welded thereto held in overlapped engagement therewith by suitable clamps 64. The two plates 61 and 63 are of substantial length, the same as the supporting fixture 62, or a plurality of fixtures 62 may be utilized, one opposite to each of the clamps 64. The piston rod 49 is then extended to permit the arms 31 to swing in a clockwise direction, which motion causes the forward movement of the finger 38 until it engages the face of the plate 61. To assure such engagement, the spacing between the cross bars 33 and 35 may be controlled, as by an adjustable stud 65. After the end of the guide finger 38 engages the face, the further movement in a clockwise direction to the links 31, due to the weight of the link assembly which overcomes the tension of the spring 42, will cause the downward movement of the cross bar 35 away from the cross bar 33 until the end of the finger rests upon the top of the plate 63. The welding current is then turned on and the welding of the joint begins as the motor 25, which is also energized, carries the device 10 along the track 24 at a welding speed.

It will be noted from Figs. 4 and 5 that the welding rod engages the top corner of the plate 63 so as to avoid burning a hole through the plate 61, and this position is maintained by the adjacent guide finger 38 which follows the top edge of the plate 63 at all times whether or not the plates curve to the left or right or whether the joint follows an upward or downward path. After the device has been carried the length of the joint, the electric circuits are interrupted, the piston rod 49 is retracted and the motor 25 energized in reverse to return the device to its initial position.

A flux delivering nozzle 76 is secured to the filler block 36, having a flexible conduit 77 extending therefrom to a hopper 78 containing the flux material which is of the conventional type. A solenoid actuated control mechanism 79 may be provided on the hopper, operated simultaneously with the welding circuit, which regulates the feeding of the flux material to the flexible tube 77 and the nozzle 76 during the welding operation. The end of the nozzle is disposed adjacent to the end of the rod 38 in position to deliver the flux to a point ahead of the arc during the welding operation so that the arc is submerged in the flux at all times. The clamps 64 may have plates 60 mounted thereon to provide a continuous platform along the joint for retaining a mound of flux thereover as the device moves therealong.

In Fig. 3 a further extension of the invention is illustrated, that wherein the track 24 is disposed above a chassis frame rail 66 which is made up of an upwardly presenting channel rail member 67 and a downwardly presenting channel rail member 68 which telescopes therewithin. This produces the overlapping of the side flanges 69 over the flanges 71. The carriage 72 which is driven along the track 24 carries a pair of the welding devices 10 so that both sides of the box-section rail 66 are welded during a single passage of the device along the longitudinal length thereof. In this arrangement, the welding rods 73 and control box 56 are supported above the device, the rod being fed through a flexible tube 79 having a current carrying braided sheath 80 thereabout which permits the feeding of the rod through the tip 37 and the supply of welding current through the sheath thereto. The control boxes 56 regulate the feeding of the welding rod to the point of weld and tend to urge the cross bar 35 toward the work. The chassis frame has the joint follow a contour from the section illustrated to an extreme left and lower position illustrated at 74 to an extreme right and upper position illustrated at 75 along each side of the rail.

It will be noted that a second stabilizing roller 28 is employed on the side of the track 24 so that both of the devices have rollers 28 bearing against rails 39. Thus it will be seen that box-section channel members, having the overlapped or similar joints at each side, are welded simultaneously as the welding devices 10 are moved therealong. By supporting the guiding finger, the welding rod and the flux nozzle adjacent to each other on the double parallelogram support, the guide fingers will guide the ends of the rods to accurately follow the joints whether they move upwardly or downwardly or to the right or left, following the shape of the box-section structure throughout the longitudinal length thereof. It is to be understood that when the box-section structure is of substantial length, such as a chassis side rail, several pairs of the devices 10, as illustrated in Fig. 3, may be spaced apart and operated on the same or different tracks simultaneously, thereby reducing the time required to complete the welding operation along the entire length of the rail. The track 24 supports pillars 81 having pressure feet 82 thereon which force the upper channel element 66 downwardly toward the lower channel element 67 when the table 59 is raised. The table is mounted on pistons (not shown) which lower the work to loading position, after which the table is raised to support the work in welding position. Additional side clamps 64, having plates 60 thereon, are also utilized for positioning the rail on the supporting table 59. Struck-out projections 83 along the flanges 68 and 69 of the lower channel element limit the downward movement of the upper channel element and accurately space the webs of the two channel elements from each other.

The use of a plurality of the devices for welding a workpiece of substantial length is illustrated in Fig. 6. In this arrangement, the box-section structure 66 is a chassis frame for an automotive vehicle having overlapped or other type of side flanges. Track elements 24 are spaced apart and provided with sloping portions to follow the shape of the rail member so as to reduce the amount of movement toward and away from the rail member required of the end of the guide finger and welding rod during a welding operation. It will be noted that four pairs of separate welding devices 10 are employed, spaced substantially equidistant apart so that the time required to produce the welding operation by each pair of devices is equal and the overall welding time is substantially reduced. Since the speed of movement of the devices is limited to the time required for the welding operation, the use of the four sets of welding devices reduces the time of welding a complete chassis frame so that four chassis frames could be welded in a single machine in the time that a single chassis frame could be welded by a single pair of devices 10.

In the arrangement illustrated in Figs. 6 and 7, the pair of tracks 24 supports the pair of independent devices 10 in the same manner as illustrated in Fig. 1, with the exception that one has a left-hand position while the other has a right-hand position. A plurality of cylinders 84 are supported on the central longitudinal tie member 87 of the machine, having piston rods 85 thereon carrying pressure feet 86 which apply a predetermined pressure between the channel members for retaining them in accurate spaced relation during the welding operation. Clamps 64, having plates 60 thereon, may also be utilized for clamping the chassis rail member on the table 59. Otherwise the devices are the same as that described hereinabove in detail.

Referring to Figs. 4 and 5, it will be noted that a platform 88 is carried by the filler block 36 for movement relative thereto. Headed pins 89 extend through slots in the platform and one or more springs 91 urge the platform toward the work. The platform is of sufficient length to retain a mound of flux over the joint to be welded at the point of weld as the device and work are relatively moved.

Fig. 8 illustrates a pair of channel elements 92 and 93 having outwardly projecting flanges 94, the outer adjacent edges of which are to be welded at 95. In this arrangement, a guiding finger 96 is employed having a vertical surface 97 which first engages the edges and a horizontal surface 98 which moves downwardly thereafter to engage the top of the flange to thereby accurately guide the welding rod along the edges to be welded.

In Fig. 9 a further form of construction is illustrated, that wherein a plate 99 is disposed perpendicular to a second plate 101. In this arrangement, a finger 102 engages the face of the plate 99 and moves downwardly into the corner formed by the plate 101 to guide the welding rod therealong to produce the weld 103. The welds in both corners may be made simultaneously by the two welding devices, as pointed out hereinabove. This is also true of the structure of Fig. 8 mentioned hereinabove.

In Fig. 10 a channel member 92, having outwardly extending flanges 94, is welded to a plate 104, and in this arrangement a finger 105 is employed, similar to the finger 96 illustrated in the structure of Fig. 8. The welding rod is accurately guided along the edges of the plate and the flange, and both edges may be welded simultaneously by two devices, as pointed out hereinabove.

In Fig. 11 a channel member 106 is illustrated, having a plate 107 extending across the open end inwardly of the ends, and in such arrangement a guiding finger, such as finger 102, is employed to follow the corners formed by the extending arms of the channel and the plate 107. When the welds are made simultaneously, the devices are offset so that the guide fingers may be in crossed relation above the plate 107.

In Fig. 12 a pair of channel members 108 and 109 is illustrated having the projecting arms abutted and seam-welded, and in such arrangement a guide finger 110 engages the side and web of the top channel element to guide the welding rod along the seam. This type of arrangement may be employed when the distance between the web of the channel and the edge of the projecting arms is uniform throughout the length of the channel element.

It is to be understood that in all of the arrangements provision is made for supporting the flux adjacent to the arc so that the arc will be submerged within the flux as the welding progresses. The structures herein illustrated as being welded by the device are shown by way of example and are not limiting since many other types of structures may be welded by the device. The device is particularly useful when the joints to be welded are undulated following a serpentine path upwardly and downwardly and to the left and right. As long as the guiding surface is uniformly disposed relative to the joint to be welded, a satisfactory weld will always be produced at the joint. Similarly, the guide finger may take any form which will position the guide rod on the joint to be welded when the guide finger engages a surface and moves downwardly into engagement with a second surface upon which the finger guides the electrode.

What is claimed is:

1. The method of welding a joint formed by overlapped elements which includes the steps of, urging a guide finger first horizontally into engagement with a face an element above the joint and thereafter downwardly into engagement with the top edge of the other element of the joint, maintaining the finger in engagement with the edge as the joint and finger are relatively moved and as the edge curves to the right, left, upwardly and downwardly along the path of movement of the finger, and feeding a welding rod toward the edge and maintaining it adjacent to said guide finger at all points along the joint.

2. The method of welding a joint formed by overlapped elements which includes the steps of, first urging a guide finger horizontally into engagement with the face of one element and thereafter downwardly into engagement with the top edge of the other element at the overlapped joint thereof, relatively moving the finger and the edge longitudinally along the joint, maintaining the finger in engagement with the edge as the joint curves to the right, left, upwardly and downwardly, feeding a welding rod located adjacent to said guide finger toward the edge of the joint, and providing a surface along said joint for supporting a flux about said welding rod as it is moved along the joint.

3. A welding device comprising a support, parallel links disposed in a vertical plane and pivoted at one end on said support for swinging movement below the pivoted ends, a cross bar pivoted to the free ends of the links, a second pair of links disposed in a vertical plane pivoted to the free ends of the first links for pivotal movement therebelow, a second cross bar pivoted to the free ends of said second links providing a double parallelogram support which permits the second cross bar to swing both horizontally and vertically, a guide finger carried by the end of said second cross bar, means for urging the links which support the second cross bar toward the first cross bar to cause the guide fingers to strike the work before moving downwardly with the second bar to engage the joint to be welded, and a welding rod supported by said second cross bar adjacent to said guide finger.

4. A welding device as recited in claim 3, including means carried by said second cross bar for feeding said welding rod during the welding operation.

5. A welding device as recited in claim 4, including a flux nozzle carried by said second cross bar having its delivery end disposed adjacent to said welding rod.

6. A welding device as recited in claim 5, including force applying means on said second cross bar for urging it to swing on said second links toward the first cross bar.

7. A welding device as recited in claim 6, including means for urging said first links to swing in a direction toward said guide finger.

8. A welding device as recited in claim 7, including means for swinging said first links in a direction away from said guide finger.

9. A welding device as recited in claim 7, including a cylinder and piston joined by connection means to said first links in a manner to permit free movement of the links independent of the connection means in one position thereof.

10. A welding device as recited in claim 9, including adjustable means for limiting the movement of the second cross bar toward said first cross bar.

11. A guiding device comprising a support, parallel links disposed in a vertical plane pivoted at one end on said support for swinging movement below said pivoted ends, a cross bar pivoted to the free ends of the links, a second pair of links disposed in a vertical plane pivoted to the free ends of the first links, a second cross bar pivoted to the free ends of said second links providing a double parallelogram support, a guide finger carried by the forward end of said second cross bar, and force applying means on said second cross bar for urging it to swing on said second links toward the first cross bar.

12. A guiding device as recited in claim 11, including means for urging said first links to swing in a direction toward said guide finger.

13. A guiding device as recited in claim 12, including means for swinging said first links in a direction away from said guide finger.

References Cited in the file of this patent

UNITED STATES PATENTS

| | | |
|---|---|---|
| 2,061,671 | Riemenschneider | Nov. 24, 1936 |
| 2,189,399 | Lewbers | Feb. 6, 1940 |
| 2,303,720 | Berkeley | Dec. 1, 1942 |
| 2,401,722 | Clapp et al. | June 11, 1946 |
| 2,441,748 | Black | May 18, 1948 |
| 2,452,189 | Helmkamp | Oct. 26, 1948 |
| 2,472,803 | Beyer et al. | June 14, 1949 |
| 2,500,245 | Doyle | Mar. 14, 1950 |